F. MÜLLER.
LATHE.
APPLICATION FILED JAN. 3, 1910.

1,252,928.

Patented Jan. 8, 1918.
7 SHEETS—SHEET 1.

Witnesses.
J. H. Elliott
Geo. Nordstrom

Inventor:
Friederich Müller
By his Attorneys,
Sutherland & Anderson.

F. MÜLLER.
LATHE.
APPLICATION FILED JAN. 3, 1910.

1,252,928.

Patented Jan. 8, 1918.
7 SHEETS—SHEET 2.

Fig. 2.

Witnesses:
F. H. Elliott
Geof Nordstrom

Inventor:
Friederich Müller
By his Attorneys,
Sutherland & Anderson

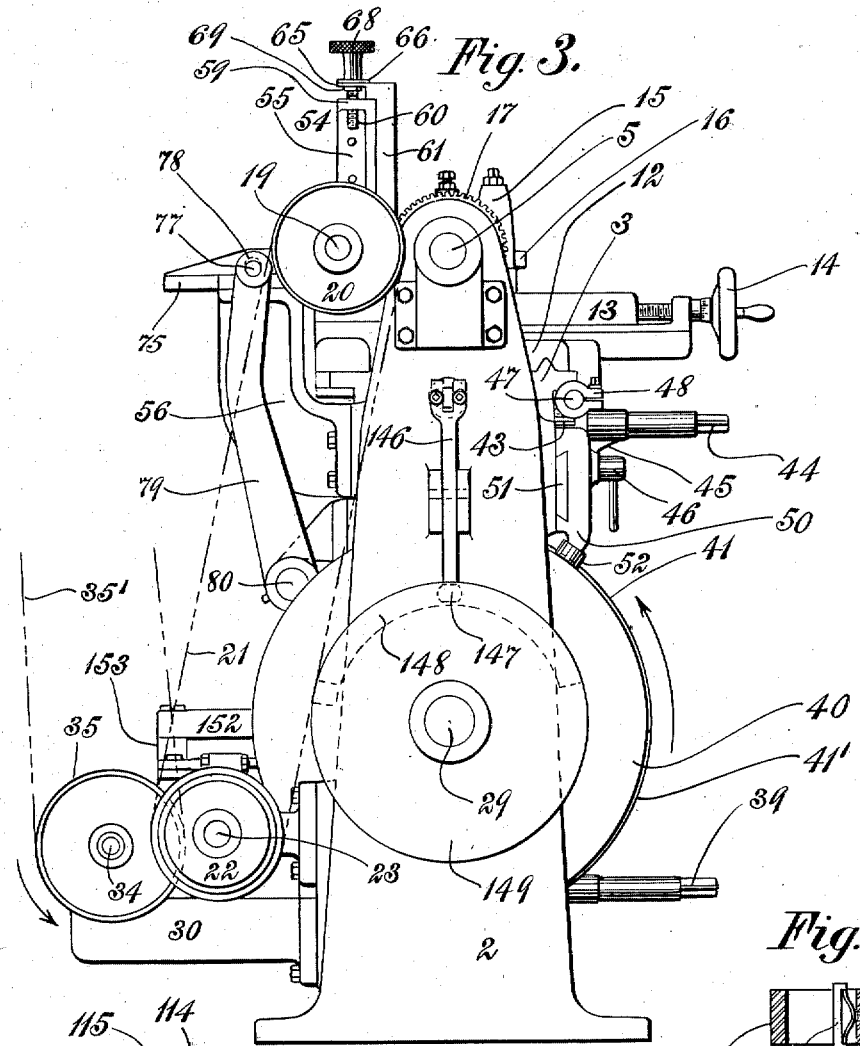
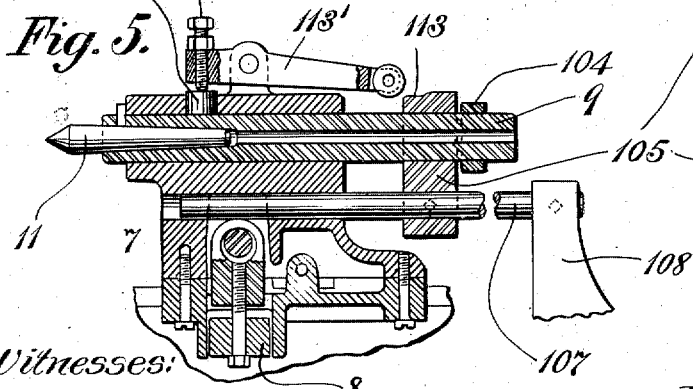

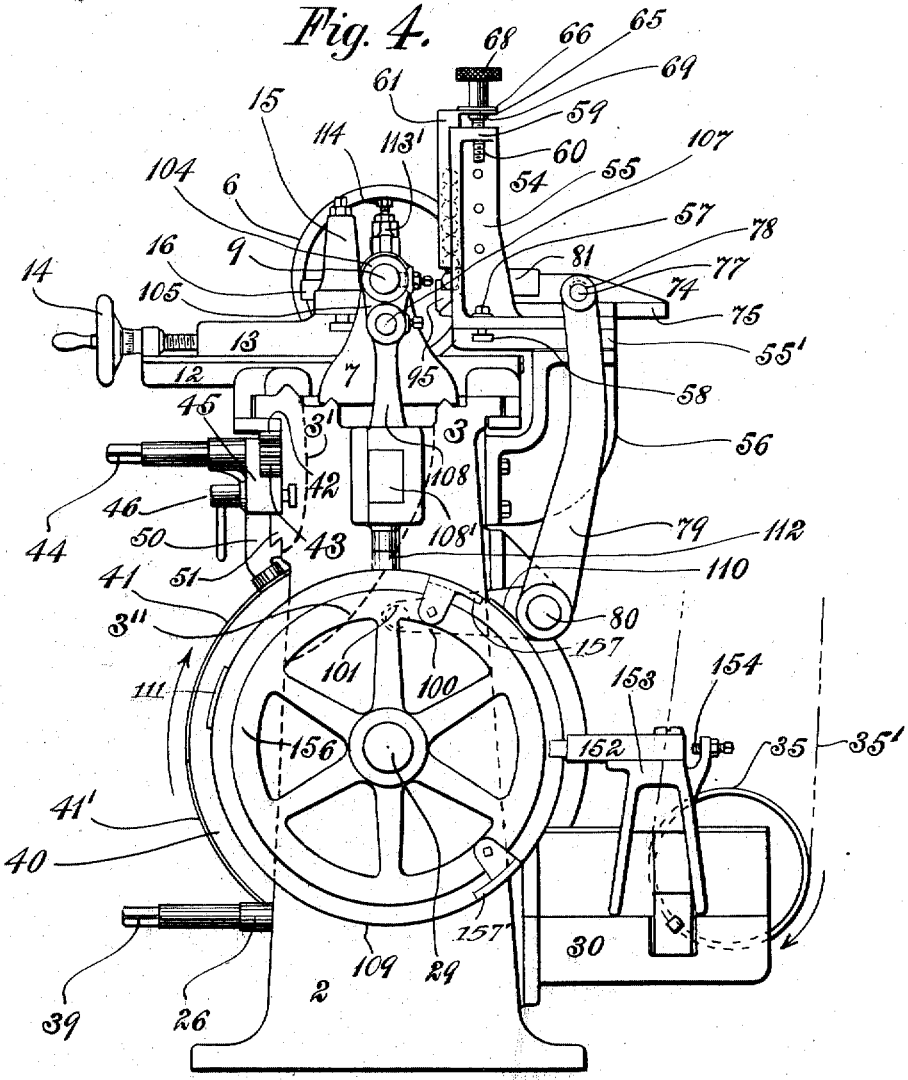

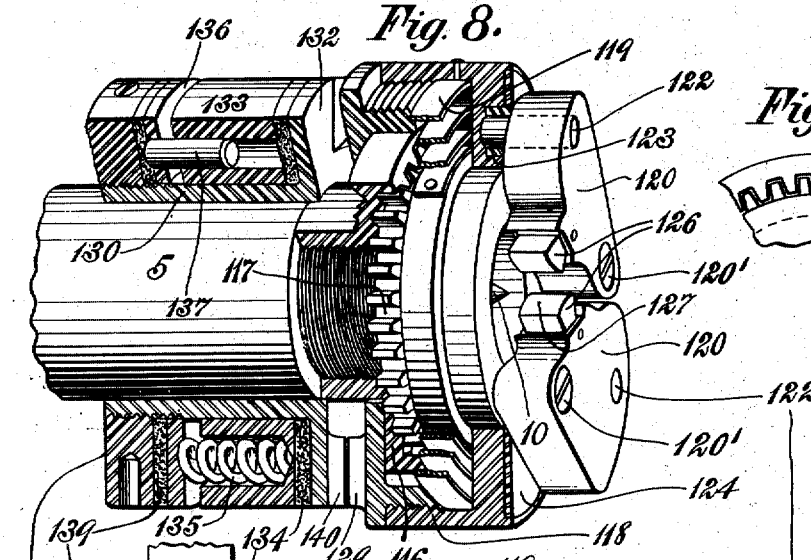

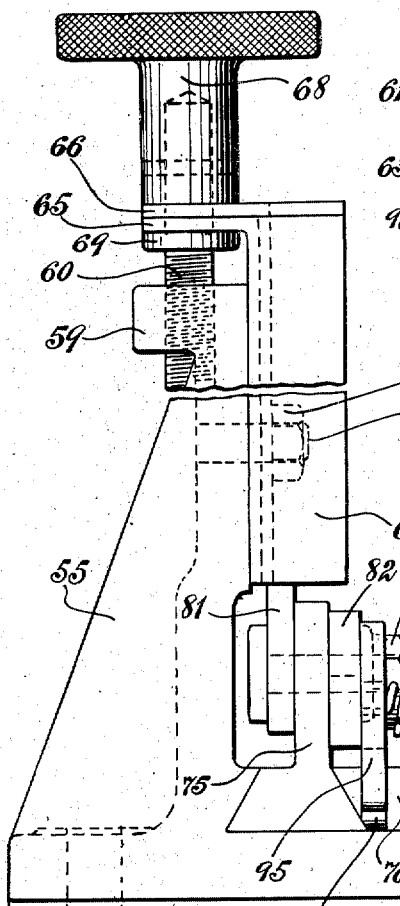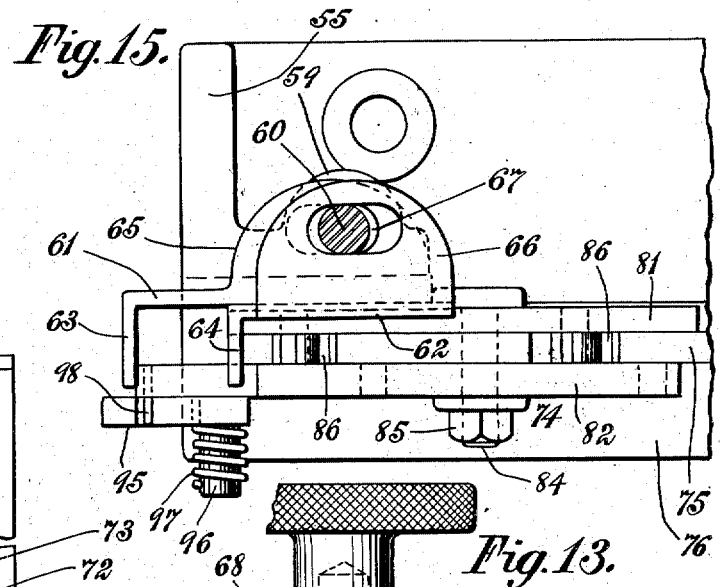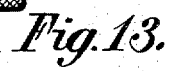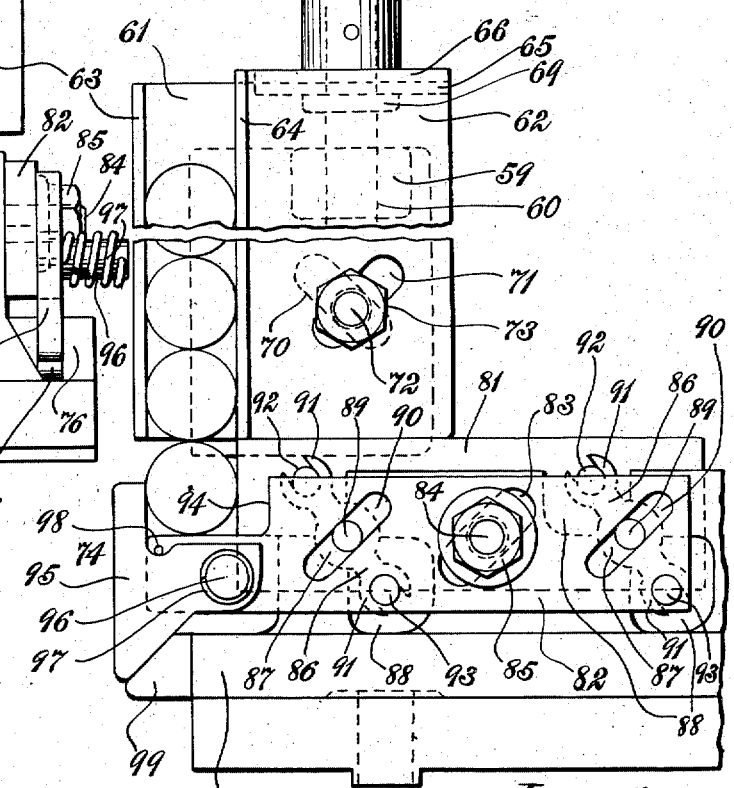

F. MÜLLER.
LATHE.
APPLICATION FILED JAN. 3, 1910.
1,252,928.
Patented Jan. 8, 1918.
7 SHEETS—SHEET 7.
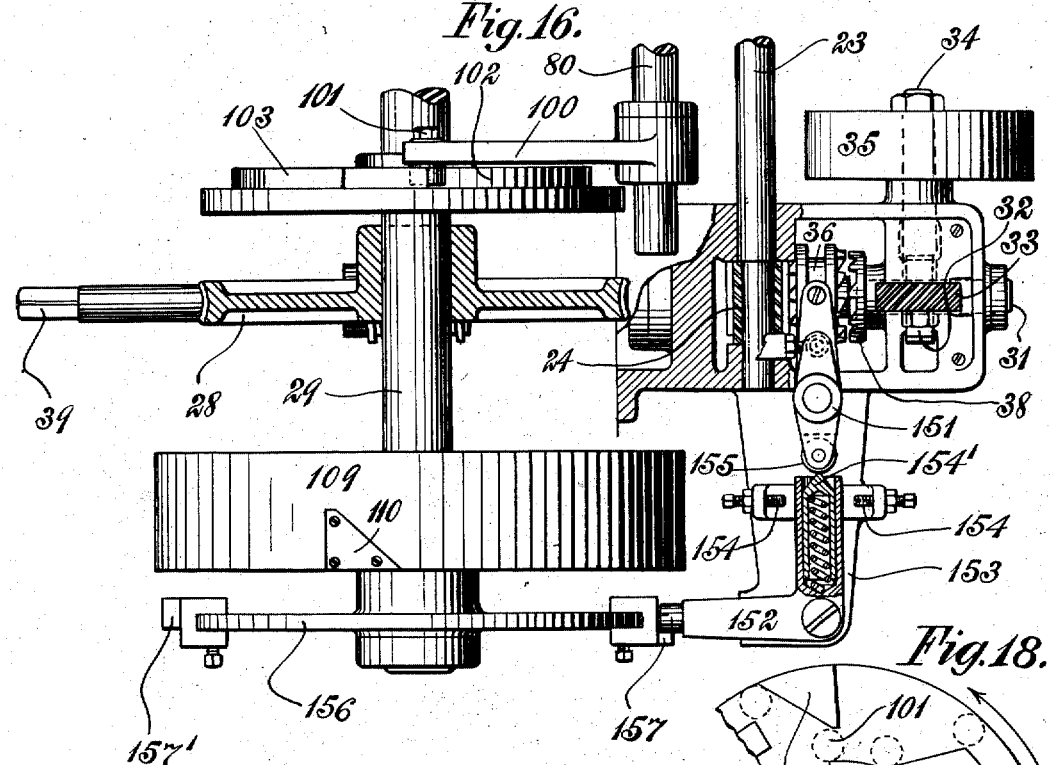
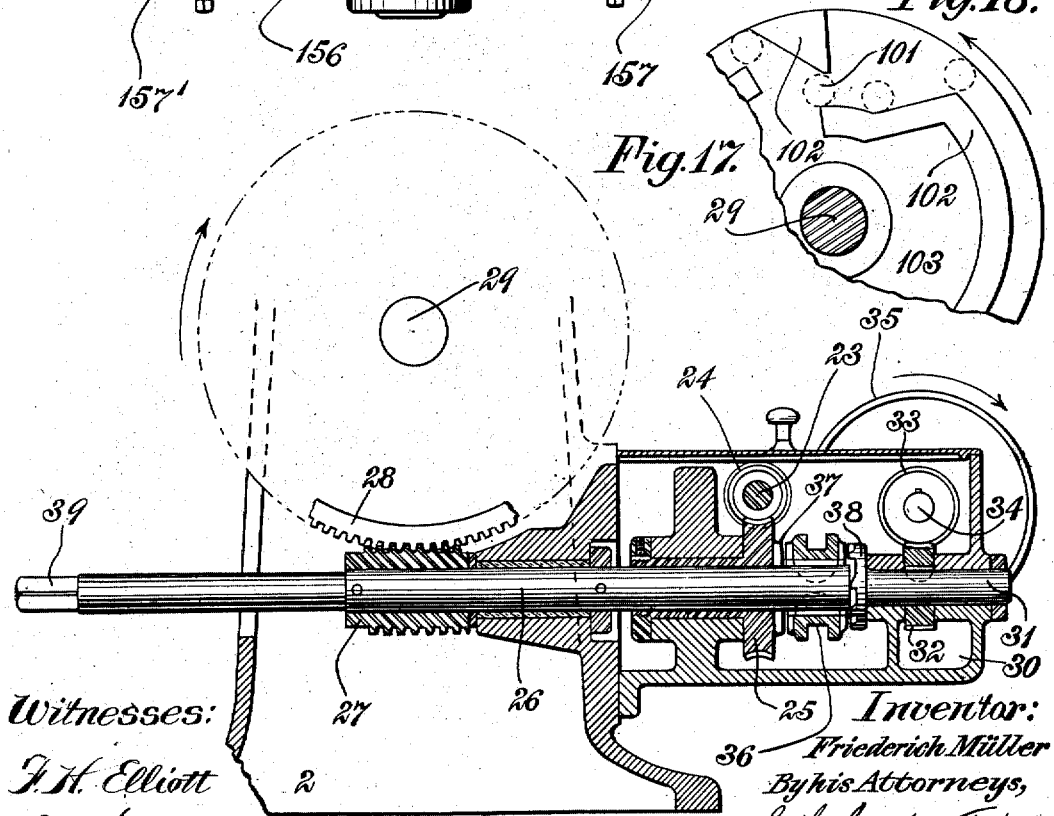

UNITED STATES PATENT OFFICE.

FRIEDERICH MÜLLER, OF HARTFORD, CONNECTICUT, ASSIGNOR TO PRATT & WHITNEY COMPANY, OF HARTFORD, CONNECTICUT, A CORPORATION OF NEW JERSEY.

LATHE.

1,252,928.  Specification of Letters Patent.  Patented Jan. 8, 1918.

Application filed January 3, 1910. Serial No. 536,106.

*To all whom it may concern:*

Be it known that I, FRIEDERICH MÜLLER, a citizen of the United States, residing at Hartford, in the county of Hartford and State of Connecticut, have invented certain new and useful Improvements in Lathes, of which the following is a specification.

This invention relates to lathes, the object of the invention being to provide an effective machine of this character in which certain of the operations are automatically performed.

In the drawings accompanying and forming part of the present specification I illustrate in detail one advantageous form of embodiment of the invention which, to enable those skilled in the art to practice it, will be fully set forth in the following description, while the novelty of the invention will be presented in the claims.

The machine represented in said drawings includes means for presenting the work and for positioning it between the centers, chucking and rotating the work, advancing the tool-carriage, releasing the work, and then retracting carriage; and these several operations occur preferably in the order named and also automatically, although there may be cases where some of the operations might be performed by hand.

I do not restrict myself to the showing made by said drawings and description for I may depart materially therefrom and still be within the scope of my invention as covered in my claims.

Referring to said drawings,

Fig. 2 is a top plan view of said lathe.

Figs. 3 and 4 are end elevations of the same as seen from the left and right respectively, in Fig. 1.

Fig. 5 is a detail view in section of the tail stock mechanism.

Fig. 6 is a view of a sliding block and its shoe.

Fig. 7 is a sectional view of said block and shoe.

Fig. 8 is a sectional perspective view of the chuck and certain adjacent parts.

Fig. 9 is a longitudinal, central sectional view of the same.

Fig. 10 is a front elevation of said chuck.

Fig. 11 is an elevation of two of the elements of said chuck.

Fig. 12 is a view of a portion of a protecting plate.

Fig. 13 is a side elevation of one side or half of the magazine.

Fig. 14 is a front elevation, and Fig. 15 a top plan view of the same.

Fig. 16 is a sectional top plan view of a portion of the driving mechanism including the speed changing clutch.

Fig. 17 is a vertical sectional view of the same, and,

Fig. 18 is a face view of a cam hereinafter described.

It will be evident that the views are on different scales. Like characters refer to like parts throughout the views.

Figure 1:
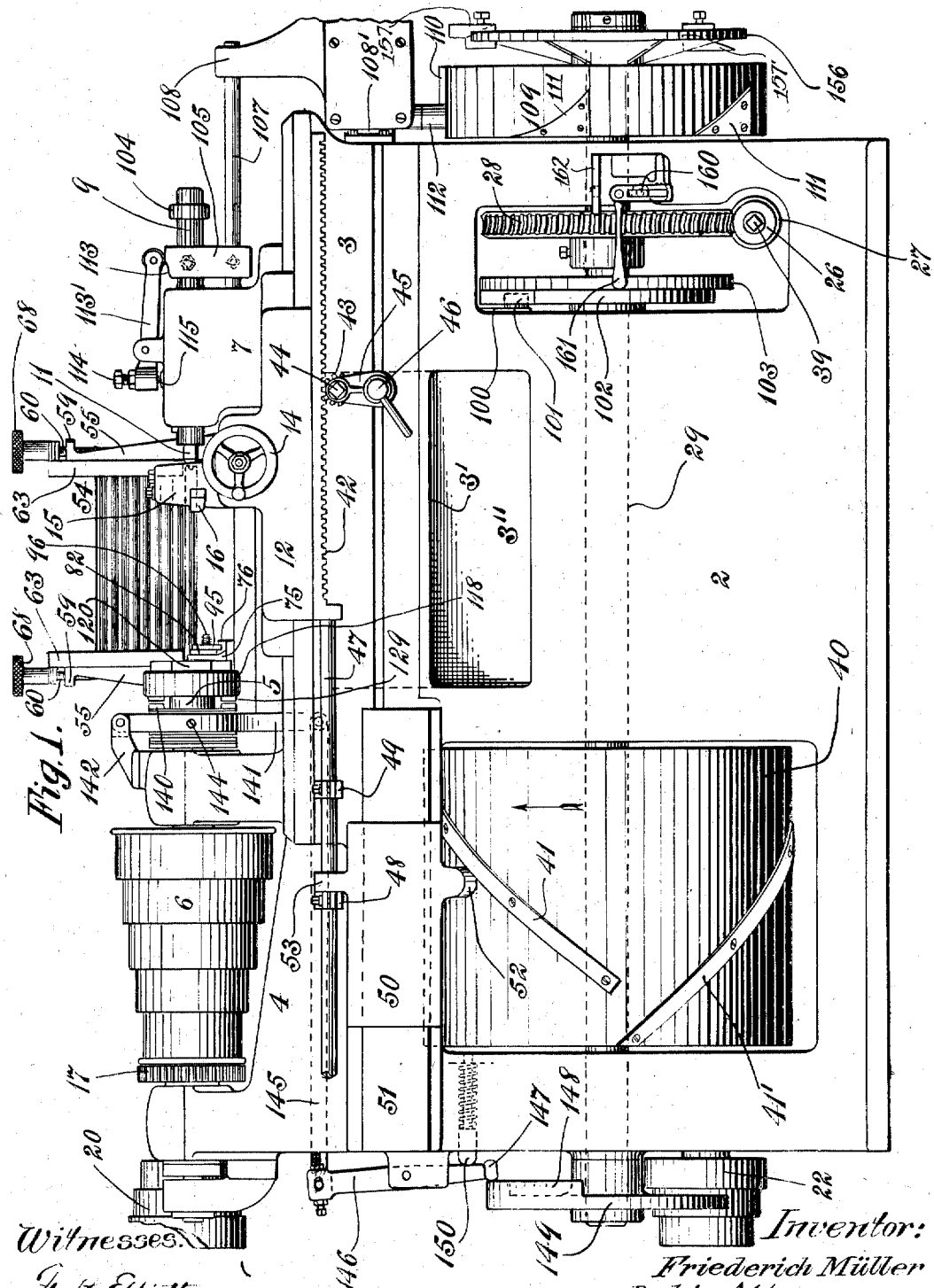
Figure 1 is a front elevation of a lathe involving my invention.

The framework of the lathe is denoted in a general way by 2 and as usual is surmounted by a bed 3 upon which certain of the moving parts are mounted and which includes the head-stock 4 which rotatively supports the live-spindle 5 to which is fastened a stepped cone pulley 6 adapted to be driven by an overhead belt although said spindle could be operated in any other desirable manner. The tail-stock is denoted in a general way by 7 and as usual is adjustable on the bed 3, being provided with clamping mechanism as 8 to hold the same in a desired adjusted position. The tail-stock 7 carries the tail-spindle 9 which as will hereinafter appear is capable of longitudinal movement, said tail-stock (see Fig. 5) being provided with a suitable bore or passage in which said tail-spindle slides. The live-spindle 5 (see Fig. 8) is provided with a center 10 and the tail-spindle with a center 11 and it is between these that the work is centered. The lathe like those of the usual form, is capable of turning various kinds of work.

The tool-carriage or main slide is designated by 12 and it travels longitudinally of and upon the bed after the usual fashion, although as will hereinafter appear, said carriage or slide 12 is moved in both directions or reciprocated by automatic mechanism. Upon the said carriage or main-slide 12 is a cross-slide 13 with which is associated the usual adjusting wheel 14 and which carries the tool-post 15 equipped with the tool 16.

There is fastened to the spindle 5, the gear 17 in mesh with the gear 18 fastened to the stud shaft 19 supported rotatively by suitable bearings on the bed 3. To the said shaft 19 there is fixed a stepped cone pulley 20 adapted to be connected by a belt 21 (shown in dotted lines in Fig. 3,) with a similar stepped pulley 22 fastened to the shaft 23 rotatively supported by suitable bearings or brackets on the rear side of the framework 2.

In the present case as will hereinafter appear the tool-carriage or main slide 12 is advanced at a low speed and the mechanism for effecting this relative slow advancing movement of said carriage preferably derives its motion from the shaft 23 and therefore from the spindle 5 while separate means, as will also hereinafter appear, is provided for causing a quick return of said carriage.

The shaft 23 has fastened to it a worm 24 (Fig. 17) in mesh with a worm-gear 25 loose on the transversely-disposed rotary shaft 26 supported by the framework 2. To said shaft 26 is fixed a worm 27 in mesh with a worm-gear 28 fastened to the shaft 29 which as will hereinafter appear, carries certain cams by which the main-slide or carriage 12, the magazine mechanism, and other devices can be operated. When the worm-gear 25 is clutched to the shaft 26 it will be apparent that the shaft 29 will be driven at a low speed from the shaft 23 through the intermediate described parts.

Said shaft 26 extends into a boxing 30 mounted on the rear side of the framework 2 and inclosing the worm 24, worm-gear 25 and certain other parts including the stud or short shaft 31. To said shaft 31 is fastened a spiral-gear 32 in mesh with a similar gear 33 fastened to a shaft 34 supported by said housing or boxing 30 and fixedly carrying exteriorly of the housing a pulley 35. This pulley 35 is driven at a relatively high speed by the use of a belt 35' (dotted lines in Fig. 4) and an overhead pulley of large diameter (not shown). The shaft 31 is in longitudinal alinement with the shaft 26 and when the two are put into driving connection, as by means of a clutch 36 the shaft 29 will be driven at its high speed so as to effect the quick return of the carriage 12 and the rapid operation of certain other devices. The worm-gear 25 is provided with a clutch section or member 37, while fixed to the shaft 31 is a complemental clutch section or member 38, and between these two clutch members the clutch 36 is mounted for sliding movement on the shaft 26.

In Figs. 16 and 17 the clutch 36 is shown as occupying its neutral or intermediate position in engagement with neither of the clutch members 37 and 38. Should the clutch 36 be shifted to the left in these two views into engagement with the clutch member 37 the shaft 29 will be turned at its low speed while should said clutch member be thrown to the right in said figures into engagement with the clutch member 38 the shaft 29 will be driven at its high speed. Said clutch is automatically shifted back and forth by means which will be hereinafter set forth. The shaft 26 has a squared head 39 at its forward end which is adapted to be engaged by a wrench so that said shaft can be turned by hand to effect through the intervention of the coöperating parts, the motion of the carriage 12 and other devices operable from the shaft 29.

To the shaft 29 there is fastened a drum 40 the framework being slotted to receive said drum and the latter having peripheral cams 41 and 41' which may, as illustrated, consist of spirally disposed strips fastened to the external surface of said drum. Attached to the under side of the carriage 12 is a rack 42 meshing with a pinion 43 fastened to a short shaft 44 rotatively supported by a bracket 45 adjustable on the forward side of the framework 2 and held in an adjusted position by a clamping device 46. The forward end of the shaft 44 is squared to receive a wrench so that said shaft can be turned by hand to move, through the rack and pinion means described, the carriage 12 longitudinally of the bed 3 independently of the automatically operative mechanism to be described.

Connected with this rack 42 is a rod or bar 47 which extends toward the head end of the machine and which carries the adjustable projections 48 and 49 preferably consisting, as illustrated, of collars. A sliding block is provided at 50, the framework at the front and near the upper forward corner being provided with a suitable way as 51 to support said block 50 for reciprocation longitudinally of the machine. The block is provided with a pendent stud which may carry an anti-friction roller 52 positioned to be engaged by the lateral surfaces of the cams 41 and 41'. The block 50 has on its upper side a vertical extension or neck 53 bored to receive freely the rod or bar 47, said extension or neck being disposed between the two adjustable projections or collars 48 and 49. It will be apparent that when the block 50 is moved toward the left in Fig. 1 the extension or neck 53 by acting against the collar 48 will, through the intermediate described parts, move the carriage 12 in a corresponding direction, this being the advancing movement of said carriage. When the block 50 is moved toward the right the extension 53 by acting against the collar 49 will move the carriage 12 toward the right, this being the retracting movement of the carriage. I have indicated by the arrow in Fig. 1 the direction of rotation of the cam-drum 40 and at this time the active face of the cam 41 is against the roller 52 so as to effect the advance of the carriage 12. When the roller 52 passes off the tail portion of the cam 41 the drum will continue to rotate so as to cause the head end of the cam 41' to bear against said roller 52 to impart a return movement to the carriage 12. With the collars 48 and 49 arranged as shown the drum 40 will turn a short distance before the carriage 12 commences its return movement or until the extension or neck strikes the collar 49. The stroke of the sliding block 50 in the present case never varies but the collars 48 and 49 provide a simple means for regulating the stroke of the carriage. For illustration if the collar 48 be moved farther to the left in Fig. 1 a shorter advancing stroke of the carriage 12 would be the result, and although the full effect of the cam 41 would be expended the said cam would not actually advance the carriage 12 until the extension 53 encountered the collar 48.

So far as certain features of the invention are concerned, the blanks to be turned may be supplied to the centers by hand, but I prefer to provide for this purpose automatic magazine mechanism. The magazine mechanism which I have illustrated is not herein claimed as constituting of itself a part of the present invention. The magazine mechanism is set forth and claimed in my divisional application for magazine mechanism, filed June 13th, 1910, as Serial No. 566,468 and renewed October 23rd, 1917, as Serial No. 198,180.

The magazine mechanism is shown best in Figs. 13 to 15 inclusive although for sake of clearness I have only illustrated one side of the magazine denoted in a general way by 54, the other being a duplicate practically of that shown in these several views. As a part of the magazine mechanism are two standards or uprights 55 the feet or bases of which rest on a plate 55' (Fig. 4) supported by brackets 56 bolted or otherwise suitably attached to the rear upper side of the framework 2. The standards are adjustable on said plate 55' toward and from each other so that the width of the magazine can be adjusted, bolts as 57 (Fig. 4) being provided to hold the said standards in their adjusted positions. The plate 55' has a T-slot or channel 58 in which the heads of the bolts may slide.

I will now proceed to describe one of the standards 55 and the parts associated therewith, this description applying to the other standard and associated parts excepting that they are oppositely formed and positioned. In this connection I will refer particularly to Figs. 13 to 15 inclusive. The standards 55 shown in these several views is assumed to be that on the left in Fig. 1. The said standard 55 is provided with an outwardly-extending head or projection 59 in which is tapped the adjusting screw 60. Fitted against the inner flat surface of said standard 55 is the plate 61 (Fig. 15) and fitted against said plate 61 is a somewhat similar plate 62, said plates having flanges or lips 63 and 64 at their forward sides which are in parallelism. The space between the flanges 63 and 64 presents a runway or channel to receive one end of each of the blanks which move downward by gravity, fitting as will be understood a corresponding runway on the other side of the magazine. The flanges or lips 63 and 64 as will hereinafter appear can be adjusted toward and from each other so as to adapt them accurately to the size of the blanks to be turned. The plates 61 and 62 are provided respectively with laterally-extending ears or lugs 65 and 66 in superposed relation, these lugs having elongated slots each denoted by 67. The elongation of said slots is transverse of the machine and through these slots the screw 60 extends. Pinned to the upper end of said screw is a circumferentially knurled or roughened thumb-piece or knob 68 the lower end of which bears against the upper surface of the upper ear 66 while the lower ear 65 bears against a shoulder 69 on the screw 60. I provide in effect that these two ears be snugly fitted between two shoulders or confining faces on the said screw and it will be obvious that when the screw is run into or out of its seat the two plates 61 and 62 are simultaneously lowered and raised. The plates 61 and 62 are provided respectively with slots 70 and 71 disposed at right angles to each other, and through these slots a stud or bolt 72 is passed, said stud or bolt being rigidly mounted on the standard 55. Threaded upon the bolt 72 is a nut 73 adapted to clamp the said plates 61 and 62 in adjusted positions. When it becomes necessary to change the width of the runway or channel defined by the two flanges or side walls 63 and 64 the nut 73 is first loosened after which the plates are raised or lowered.

Owing to the inclined slots 70 and 71 it will be clear that when the plates 61 and 62 are elevated the flanges or walls 63 and 64 are caused to separate so as to widen said runway, while when said plates are lowered the runway will be narrowed. The elongated slots 67 permit the transverse movement of the plates. During the adjustment of the said runway the center line thereof never varies; that is to say the center line is not moved either forward or backward although the size or width of said runway is changed, but this change is secured by moving the said flanges or walls 63 and 64 simultaneously toward or from each other to the same extent. Then also it is apparent that the runway or channel at one side of the magazine can be adjusted independently of the other. The work shown in the magazine is assumed to be cylindrical in form and of uniform diameter throughout its entire length and in this case the width of both runways is the same. But if the work were of different diameters at its ends one runway would have to be larger than the other and in view of the independent adjustment of the runways I can receive work which differs in size at its ends. It is of course not essential that the work be cylindrical in shape for it might be square or polygonal in cross section.

In connection with a magazine such as that set forth I provide means for transferring the stock therefrom to the centers, and I will now describe the transferring or feed device illustrated and denoted in a general way by 74, again referring to Figs. 13 to 15 inclusive.

The laterally enlarged or widened base or foot of each standard 55 supports for sliding movement the plate 75 which travels in a path transversely of the bed 3. The base of this plate 75 is made in the form of a dovetail and one side thereof bears against an angular face on the lower portion of the standard while a gib 76 suitably fastened to the base of said standard bears against the opposite side. Said plate 75 and an exactly similar plate supported by the other standard 55 constitute the body portion of the stock or blank transferring device 74. The bolts 75 are connected by a rod 77 (see Figs. 2, 3 and 4) which extends through vertical slots 78 therein, and which is connected to the upper ends of the duplicate arms 79. The arms are connected to the rock-shaft 80, supported by suitable bearings on the rear side of the framework 2. As said arms rock back and forth the two plates 75 will be reciprocated, being adapted on their forward stroke with the aid of suitable coöperating devices to carry a blank into the space between the two lathe centers and on their back stroke to return for a new blank from the magazine.

Fitted against opposite sides of the plate 75 are plates 81 and 82 having oblique slots each denoted by 83 to receive the bolt 84 rigidly supported by the intermediate plate and having a nut 85 which constitutes a simple means for clamping the three plates normally to each other. From this it will be evident that the plates 81 and 82 are adjustable and this adjustment is utilized in the present case to adjust the blank or stock transferring device 74 for work of different sizes. The central or intermediate plate 75 is shown as supporting for oscillation two rockers 86 (see especially Fig. 13) which have substantially central, circular fulcrum or bearing portions 87 fitted for rocking motion in circular seats in the said plate 75. The plate 75 is also slotted as shown at 88 in each case to permit of the swing of the two levers or rockers 86, which constitute a suitable equalizing means between the two adjustable plates 81 and 82. Said rockers are shown provided with outward extending pins or studs 89 which extend through mating guide slots 90 in the two side plates 81 and 82, it being understood that each rocker has two of such pins or studs. The terminals of the rockers or levers 86 are shown as being in the form of forks 91, the outer side plate 81 having pins 92 near its upper edge to fit in the upper forks of the two rockers while the opposite plate 82 has pins 93 near its lower edge to fit the two lower forks. It will be assumed that the outer plate 81 is thrust down, the nut 85 having of course been loosened to permit this action. As said outer plate 81 is lowered it will be moved forward, and at the same time the inner plate 82 will be elevated and moved rearward, the degrees of movement of the two plates being identical owing to the presence of the equalizing mechanism. When the adjustment is secured the nut 85 will be tightened. The inner plate 82 has a substantially right-angled notch or rabbet 94 at its front end which forms part of a pocket or aperture for receiving the blank to be transferred, said blank dropping from the magazine into said pocket.

A detent or latch 95 of bell-crank shape is pivoted by its approximately horizontal branch at 96 to the reduced forward portion of the said inner plate 82. The pocket or aperture into which the blank is received by the blank transferring device has a bottom and two sides, the bottom consisting of the bottom of the notch or rabbet 94, the rear wall being the front edge of the outer plate 81 and the forward wall being the side of the vertical branch of the detent or latch 95. This latch is normally held in operative relation by a spring 97 (Fig. 14) coiled about the pivot 96, the said latch at such time bearing against a stop pin 98 on the plate 82. The blank-transferring device when in blank receiving position has the front and rear walls of each of the apertures absolutely in vertical alinement respectively with the front and rear walls of the side runways of the magazine. In other words, the front and rear walls of these pockets or apertures are in strict vertical alinement with the side walls of the respective runways or channels so that there will be nothing to prevent the free gravitation of the lowermost blank in the magazine into the apertures of the said transferring device. It will be assumed that a blank is in the apertures of the transferring-device 74 as illustrated in Fig. 13 and that said transferring device has just commenced to advance to transfer said blank. When the transferring device is moved forward the outer plates 81 will pass under the lower open ends of the runways of the magazine to stop the descent of the blanks. When the blank transferred has been positioned between the centers 10 and 11 it will be engaged by the centers in the manner to be presently described, and then the transferring device 74 will be drawn back. During this backward motion the latches 95 will automatically recede or be tripped and thereby freed from the blank through the operation of the latter, which at this time is held stationary, and the instant that the blank thus transferred is wholly freed from the transferring device the latches will be promptly returned to their original positions by the power of the springs 97. When the transferring device is in its retracted position the latches 95 will be supported against lugs 99 on the gibs 76 so that the weight of the pile or stack of blanks is thereby taken off the latches. The blank-receiving apertures of the transferring device can be adjusted independently of each other in accordance with the adjustment of the corresponding runways. Inasmuch as the upper edge of each plate 81 engages the bottom edge of the corresponding plate 62, either of these plates can be adjusted first and then used as a gage for the adjustment of the other. In this way it is possible for the operator to adjust the aperture in the transferring device to the proper size and then correspondingly adjust the runway; or it is possible for him to first adjust the runway to the proper size and then correspondingly adjust the aperture. Either device serves as a gage for the adjustment of the other and in either case the center of the aperture, when in blank-receiving position, is coincident with the central plane of the runway. Preferably the aperture is adjusted first by properly moving the plates 81 and 82 and then the runway is adjusted by moving the plates 61 and 62 downward until the plate 62 engages the plate 81.

By the described construction, when the blank-receiving pockets or apertures at opposite sides of the stock-transferring device 74 are varied as to width the depth thereof is also correspondingly varied, so that I therefore always insure the axis of the blank being in horizontal alinement with the axis of the lathe spindles 5 and 9.

On the shaft 80 (see Figs. 4, 16 and 18) is fixed a rock-arm 100 having a stud 101 at its inner end to be engaged by cams each denoted by 102 on the inner side of the disk or wheel 103 fastened to the main or continuously rotary shaft 29. The cams are so constructed and positioned as to swing the arms 79 to thereby advance and then draw back the stock or blank transferring device 74. The dotted circles in Fig. 18 indicate the positions assumed by the stud or roller 101 during one cycle of operations of said arms 79. It will be understood that the cam disk 103 rotates continuously and that the cams 102 are so placed thereon as to cause at the proper times the advance and then the retractive movement of the blank-transferring device.

As already stated the blank is engaged by the centers 10 and 11 at the proper time and this result I secure by operating one of the spindles 5 and 9 in an endwise direction. For example I move the spindle 9 outward so as to permit the positioning of a blank between said centers 10 and 11 and when the axis of the blank coincides with those of said centers, the spindle 9 and with it the blank, is moved inward so as to center and hold said blank.

I have illustrated particularly in Fig. 5 the endwise movable tail spindle 9 and this spindle is moved toward the right in said figure to permit the positioning of the blank and afterward is moved toward the left to engage the blank. Said spindle has attached to the outer portion thereof a collar 104. Slidably mounted on the spindle is a block 105, said block being provided interiorly thereof with a spring-actuated or yieldably-mounted shoe 106 (see Figs. 6 and 7) which bears constantly against the outer surface of said spindle. When the block 105 is moved toward the left in the manner to be presently described, it moves the spindle 9 toward the left, causing the center 11 to engage a blank which has been moved into position by the transferring device 74. The blank is moved endwise into engagement with the center 10, whereupon endwise movement of the spindle 9 ceases and the block 105 slides ineffectively along the spindle, thus maintaining a definite predetermined pressure between the centers and the blank. The block 105 is rigidly fastened to the rod 107 having a depending head 108 at its outer end, the tail stock 7 having a bore or passage for receiving and guiding said rod 107. The framework 2 has an outward extending guide-projection 108' to slidingly receive the head 108 as shown best in Figs. 1 and 4. Fastened to the shaft 29 near one end thereof (see Figs. 1 and 16) is a wheel 109 the periphery of which is provided with cams 110 and 111, the said cams being coöperative with a depending stud or anti-friction roller 112 on the head 108. The cam 110 by acting against the stud 112 serves to move the head 108 inward, while the cam 111 by operating against said stud moves the head 108 outward. When said head 108 is moved inward the spindle 9 is moved in a corresponding direction while on the opposite motion of the head the spindle 9 moves outward, there being sufficient interval between the actions of the two cams to hold the centers closed and open respectively long enough to carry out desired steps in the operation of the lathe. After the blank has been firmly engaged by the centers the cam 110 continues to move the block 105 inward but owing to the resistance of the blank said block slips on the spindle and at this time the said block becomes effective for operating locking or clamping mechanism for the said spindle so that the latter cannot be accidentally moved backward during the turning operation. For the purpose set forth said block has a cam surface 113 (see Fig. 5) which is adapted to engage the tail of a lever 113' fulcrumed between its ends on the tail-stock 7. The lever 113' is provided at its inner end with a screw 114 constituting a suitable adjustable stop, the tip or lower end of which coöperates with a clamping member or shoe 115 set into vertical opening in said tail stock and engaging the surface of the spindle 9. The cam 113 is shown out of engagement with the lever 113' in Fig. 5, the spindle 9 at this time being in its right-hand position. When the spindle is moved toward the left as described the block 105 as it slips along said spindle will apply its force to the lever 113' through the cam 113 to swing the inner and short arm of said lever 113' down and thereby force the screw 114 to press the shoe or clamp 115 into firm engagement with the spindle 9. By the means described the centers are engaged with the blank and locked against disengagement. The blank is thus held until the completion of the turning operation, whereupon the movement of the block 105 toward the right serves first to release the spindle and afterward to move it toward the right.

After the work is centered and held it must be driven or rotated and preferably though not necessarily the power for securing this action is derived from the live or head spindle 5. While rotation can be effected in any one of several ways I have found that it can be advantageously obtained through the agency of an automatically operative chuck, the jaws of which are opened to receive the blank when it is engaged by the centers and are then closed on the centered blank so that the latter is rotated by said spindle 5. At the conclusion of the turning operation the chuck jaws are opened and the blank is thereby released.

The chuck is so constructed that the jaws thereof will engage the blank without disturbing its position on the centers. The jaws are laterally movable or yieldable so as to accommodate themselves to any eccentricity or irregularity of the blank. Preferably the jaws are so mounted that they are permitted to "float" or yield in any direction. But as concerns certain features of the invention, I do not limit myself to a chuck with universally yieldable or floating jaws.

A chuck which I have found satisfactory for my purposes is illustrated in detail in Figs. 8 to 12 inclusive and will now be described. I do not herein claim the chuck by itself as constituting a part of the present invention as it is presented and claimed in my divisional application for chucks, Serial No. 566,467, filed June 13th, 1910, upon which has been issued Patent 1,187,920, dated June 20th, 1916. The forward end of the spindle 5 is reduced and circumferentially threaded to receive the body portion of the chuck driving member 116 having internal teeth, from which it will be evident that said member 116 rotates with the said spindle 5. Said member 116 incloses a driven member 117 having peripheral teeth which mesh with the internal teeth on the driving member 116. The mesh between the teeth of said driving and driven members is a very free or loose one so that the driven member is capable of yielding laterally in any direction. The driving member 116 is surrounded by a two-part or sectional barrel or casing 118 which incloses the driving and driven members and which may turn relatively thereto. Between the front edge of the driving member 116 and the front wall of the barrel or casing 118 a coiled spring 119 is disposed, one end of said spring being connected with the outside of the floating member 117 while the other end of said spring is connected with the inner surface of the barrel or casing 118. The said chuck is shown as provided with three jaws 120 which are mounted for swinging movement eccentrically thereof, pivots 120' being provided to connect said jaws with the driven member 117. Each of said jaws 120 is provided with an inward extending stud or pin 122 fitting a cam-groove 123 in the front face of the forward wall of the barrel or casing 118. The jaws 120 as will be clear are so mounted as to swing toward and from the center of the chuck a point which is approximately coincident with the axis of the center 10. The constant tendency of the coiled spring 119 is to move the barrel 118 in the direction of the arrow in Fig. 10 and thereby through the walls of the cam-slots acting on the studs 122 to swing the three jaws inward. I interpose between the jaws 120 and the barrel 118 and driven member 117 a plate or disk 124 which extends across the joint between the barrel and driven member and which thereby prevents chips and the like entering the interior of the chuck from the front thereof. The plate is attached in some suitable manner to said driven member 117 and has arcuate guide slots 125 through which the respective studs 122 pass, said slots 125 being on arcs struck from the centers of motion of the respective jaws 120. The jaws 120 have at their operative portions supplemental or auxiliary jaws 126 which are pivoted to the main jaws 120 and which have eccentric surfaces 127 for directly engaging the blank, the result being that when the blank is turned these auxiliary jaws are automatically tightened upon the work; that is to say the mere act of rotating the blank tends to tighten said auxiliary jaws thereon. Coiled springs 128 surround the pivots of the jaws 126 and normally hold the said jaws with their lowest points initially in position to initially engage the work. Inasmuch as the jaws 120 are carried by the driven member 117 which is laterally yieldable in any direction as already stated, the jaws serve to firmly engage the blank irrespective of any irregularity or eccentricity thereof. The three jaws, with the member 117, are capable of moving bodily in any direction to accommodate the work so as not to disturb its position on the centers.

Upon the inner face of the barrel or casing 118 are two projections or lugs 129 and at intervals a suitable device is moved into the path of these lugs for the purpose of preventing the turning of said barrel with the driven member 117 in consequence of which the jaws 120 will be opened.

Loose on the forward portion of the spindle 5 is a sleeve 130 provided at its front with an annular flange 132. Encircling and sliding on the sleeve 130 is a ring 133 and between said ring 133 and the flange 132 is a washer 134 of suitable frictional material, such as leather. The ring, the friction washer and the flange are pressed together by one or more push springs 135 seated in sockets 135' in said ring 133. The springs bear against the bottoms of the sockets and also against a relatively fixed disk 136 surrounding the sleeve 130. The disk is provided with one or more guide pins 137 adapted to enter bores in said ring 133 to prevent turning of said ring as the same is moved back and forth on the bank or sleeve 130. Non-rotatively fitted to the inner end of the sleeve 130 is a collar 138 and between this collar 138 and the disk 136 is a washer 139 of frictional material. It will be seen that the two washers 134 and 139 serve to provide a frictional connection between the ring 133 and the sleeve 130. The sleeve can be turned with respect to the ring but in so doing the friction offered by the two washers 134 and 139 must be overcome. On the front face of the flange 132 are two projections 140 coöperative with the projections 129, the projections 140 being movable into and out of the path of said projections 129 on the movement of the sleeve or band 130. Said projections are shown out of contact in Fig. 9 but it will be evident that when the projections 140 are moved into the path of the projections 129 the jaws 120 will be opened to receive a blank.

As a suitable means for shifting the sleeve 130, the lever 141 (see Figs. 1, 2 and 9) is utilized, said lever being pivoted at its upper end to a bracket 142 on the head-stock 4 and having an open or loop portion 143 to inclose the sleeve 130. The open or loop portion is connected with the ring 133 by screws 144. When said lever is swung to the right in Fig. 9 the jaws 120 will be opened through the agency of the intermediate parts, while opposite movement will free said jaws so that they can be closed on the blank by the power of the spring 119.

A rod 145 is pivoted to the lower end of the shifting lever 141 and to the outer end of said rod is pivoted the upper end of a lever 146 pivotally supported between its ends on the head end of the framework 2. The lever 146 has at its lower end an anti-friction roller 147 coöperative with the cam-surface 148 of a cam 149 fastened to the shaft 29, the cam surface 148 being on the inner side of said cam. The cam surface is adapted at the proper time to thrust the lower arm of the lever 146 inward and thereby through the rod 145 draw the clutch shifting lever 141 backward to a position to effect the release of the jaws 120 and their consequent closing. At the proper point in the operation of the machine the active portion of the cam 148 will pass abruptly off the roller 147 so that the lever 146 is free to be shifted as for instance by a spring plunger 150 acting against the lower portion of the same. The moment that the cam 148 frees said lever 146 the spring plunger 150 pushes the lower branch of the same outward, thereby moving the rod 145 in the opposite direction and pushing the projections 140 (Fig. 9) into the path of the projections 129 to secure the opening of the jaws 120. The frictional effect exerted by the two washers 134 and 139 is greater than the force of the spring 119 so that when the projections 140 arrest the projections 129 in the manner previously described the jaws 120 will be opened. When the jaws have been opened to their maximum extent and when the studs 122 have encountered the end walls of the cam-slots 123 the sleeve 130 with the flange 132 and the collar 138 will slip on the washers 134 and 139 and therefore turn with respect to the ring 133 and disk 136, the jaws 120 at this time being open. As previously indicated the instant that the projections 140 are drawn out of the path of the projections 129 the said jaws 120 will be closed by the spring 119. It will be seen that when the projections 140 are initially moved into the path of the projections 129 the rotation of the housing 118 is suddenly arrested by a hammer-like blow which serves to start the releasing movement of the jaws. During turning the jaws are very firmly clamped against the blank and it is necessary to provide a sudden shock or blow to release them. This is brought about by the engagement of the stationary projections 140 with the rapidly moving projections 129.

Referring now to Figs. 1 and 16.

It will be remembered that I have described a clutch member 36 for alternately putting the quick and slow feeding mechanisms into action and as a suitable means for shifting this clutch, the lever 151 may be utilized. The lever is mounted for swinging movement on the framework 2 and has a forked connection with the clutch member as is usual. Coöperative with the lever 151 is a bell-crank lever 152 fulcrumed at its angle to a bracket 153 on said framework 2. The bracket is provided with suitable limiting stops, as screws 154, by which the amount of throw of said lever 152 may be adjustably limited, the inner branch of said lever oscillating between said stops or screws. The inner branch of the lever is provided with a spring plunger 154' the beveled head of which coöperates with a stud or anti-friction roller 155 on the tail or outer portion of the clutch shifting device 151. Fastened to the outer end of the shaft 29 is a disk 156 provided at or near its periphery with adjustable tappets or cams 157 and 157' adapted alternately to engage the outer arm of the lever 152 as shown in Fig. 16. As the wheel or disk 156 rotates the cam device 157 will swing the outer arm of the bell-crank lever 152 in an inward direction thereby causing the beveled head of the spring-plunger 154' to ride off the anti-friction roller 153 so that the spring of said plunger 154' thrusts the outer branch of the shifting lever 151 to the left in said Fig. 16. This movement of the shifting lever moves the clutch member 36 into engagement with the clutch member 38, thereby effecting the rapid rotation of the shaft 26 and consequently of the shaft 29 together with the several cams carried thereby. When the tappet or cam-device 157' comes into contact with the lever 152 the operation just described is reversed, thereby engaging the clutch member 36 with the clutch member 37 to rotate the shaft 26 and the connected parts relatively slowly.

It will be understood that the several cams are so mounted on the shaft 29 that the movement of the carriage toward the left or in the cutting direction takes place while the shaft 29 is turning slowly, and that all of the other operations, including the supplying, centering and chucking of the blank and the return of the carriage, take place while the shaft 29 is turning rapidly.

As shown in Figs. 1 and 2, a rod 160 is pivoted to the lever 151, and extends toward the front of the lathe, where it is connected with a hand lever 161 mounted on the framework 2. By means of the lever the rod may be moved endwise so as to throw the clutch 36 to put either the slow or quick feed mechanisms into action or to throw said clutch into its intermediate position and thereby stop the machine. In connection with said lever 161 there is a notched detent plate 162 on the framework 2 to hold the lever in its central position when the clutch 36 is shifted to its neutral position by hand.

The operation of the lathe is as follows:

In Figs. 1 and 2 the centers 10 and 11 are shown as engaging a blank, the drum 40 at this time turning in the direction of the arrow. The cam 110 has thrust the spindle 9 to its inner position and afterward through the intermediate parts, has set the clamp 115 in its spindle clamping position as previously set forth. On the rotation of the drum 40 in the direction indicated it serves through the intermediate parts to advance the carriage 12, the tool 16 on which is assumed to be turning the work or blank. The drum 40 during this time is being driven by the slow feed acting from the spindle 5 in the manner already described. The cam 148 is against the roller 147 so as to permit the clutch jaws 120 to be held closed upon the blank by the spring 119. The blank transferring device during the turning operation or while the carriage 12 is being advanced is in its retracted position as shown in Figs. 3 and 4 with a blank therein. As already set forth, the carriage 12 is advanced at a low speed, but when the advancing movement of the carriage has been completed the tappet 157 will engage the tail of the lever 152 and thereby throw the high speed mechanism into operation in the manner already described. At about the time the roller 52 passes off the tail of the cam-strip 41 (at which time the advancing motion of the carriage will have been completed), the cam 148 will pass out of engagement with the roller 147. Then the spring plunger 150 becomes operative for snapping the lower branch of the lever 146 outward and thereby through the intermediate described parts opening the jaws 120 so that the turned blank can fall from between the centers 10 and 11 when the same are separated. The centers are separated just after the carriage 12 has completed its advancing movement and this action is secured by the cam 111 striking the roller 112 which acts first through the intermediate parts to disengage the clamp 115 and then to slide the spindle 9 outward, whereby the blank is released. When the blank is released it falls from between the centers 10 and 11 and through an opening 3' in the bed 3 of the framework 2, the discharge end of the opening 3' being located in the forward side of the framework. The bottom 3" of the opening is preferably inclined so as to facilitate the passage of the turned blank toward a suitable receptacle (not shown) at the front side of the machine under the discharge end of the opening.

The spindle 9 is moved outward to its maximum extent by said cam 111 and is maintained in this position until a new blank is put in alinement with the two centers 10 and 11 by the forward movement of the blank-transferring device 74. Then as will be understood the cam 110 will operate through the said described parts to engage the center 11 with the work and then to clamp the spindle. When the centers 10 and 11 are separated the turned blank is released and the blank-transferring device is moved forward. When the centers are separated to their maximum extent the blank is alined axially with them, at which time the spindle 9 is caused to move inward in the manner described to engage the center 11 with the blank. It will be understood that the center 11 moves the blank longitudinally in the transferring device into engagement with the center 10 in the way already described. Then the spindle 9 is clamped and the blank-transferring device is caused to move backward. When this occurs the latches 95 automatically free or disengage themselves from the centered blank.

What I claim is:

1. In a lathe having live and dead centers with fixed axes, the combination of mechanism including a magazine for supplying a blank to the centers, mechanism for engaging the centers with the blank with a predetermined pressure, a lock for preventing separation of the centers, a laterally yieldable device rotatable with the live center for engaging and driving the blank, a movable tool carriage, and mechanism for automatically operating the aforesaid elements in succession, (1st) to supply a blank, (2nd) to engage the centers with the blank and effect locking and to engage the blank for driving, (3rd) to move the tool carriage to effect cutting and (4th) to return the carriage, to release the driving device and to separate the centers.

2. In an apparatus of the character described, in combination, blank supporting means adapted to contact a blank at its ends, means adapted to engage the blank at one end for rotation, means whereby the supporting means automatically coöperate to afford a given contacting pressure irrespective of the length of the blank, and means whereby the engaging means accommodates itself to eccentricities in position or shape of the blank so as not to displace said blank with respect to the supporting means.

3. In a lathe, a dead center, a live center, a magazine for blanks, automatic means for positioning a blank between the centers, and automatic means for advancing the dead center into contact with the blank at a determinate pressure irrespective of the length of the blank.

4. In a lathe, a dead center, a live center, a magazine for blanks, automatic means for positioning a blank between the centers, automatic means for advancing the dead center into contact with the blank at a determinate pressure, and means for then securing the dead center in position for a desired time.

5. In a lathe, a dead center, a live center, a magazine for blanks, automatic means for positioning a blank between the centers, automatic means for advancing the dead center into contact with the blank and securing it in position when a determinate pressure irrespective of the length of the blank has been attained, and automatic means brought into action by the completion of the operation upon the blank for then unlocking and retracting the dead center to release the blank.

6. In an apparatus of the character described, in combination, means comprising a center and a floating chuck adapted to support a blank at one end for rotation, means movable into and out of contacting position with the opposite end of said blank, and actuating means for moving said movable means into contacting position comprising a member adapted to yield when a certain contacting pressure is obtained.

7. In an apparatus of the character described, in combination, means comprising a center and a gripper member floating with respect thereto adapted to support a blank at one end for rotation, means movable into and out of contacting position with the opposite end of said blank, actuating means for moving said movable means into contacting position comprising a member adapted to yield when a certain contacting pressure is obtained, and means adapted upon continued movement of the last said means to lock said movable means in contacting position.

8. In an apparatus of the character described, in combination, a frame, blank contacting means relatively fixed therewith comprising a center and means adapted to rotatively engage a blank contacted by said center without displacing the same, a second blank contacting member relatively movable with respect to said frame, and means adapted automatically to move said second contacting member to cause gripping of the blank between said fixed means and said movable member.

9. In an apparatus of the character described, in combination, means adapted to contact a blank at one end, means adapted to automatically contact the blank at its opposite end, and laterally yielding means automatically engaging the blank for rotation, such means avoiding lateral displacement of the blank on the contacts.

10. In an apparatus of the character described, in combination, blank contacting means, means whereby a blank may be automatically mounted between said contacting means, and means adapted automatically to engage the blank for rotation, such means engaging the blank without throwing it off center.

11. In an apparatus of the character described, in combination, blank contacting means, means whereby a blank may be automatically mounted between said contacting means, means comprising a driving member and movable gripper jaws loosely associated therewith adapted automatically to engage the blank for rotation and simultaneously avoid lateral displacement of the blank with respect to its mounting and to said driving member.

12. In an apparatus of the character described, in combination, blank contacting means adapted to automatically contact opposite ends of a blank, a chuck coöperatively associated with said means at one end of the blank to cause rotation of said blank without changing its position on the contacting means, means whereby the chuck is automatically closed when the blank engages the last said contacting means, and means adapted automatically to open said chuck and separate said contacting means to permit the discharge of the blank therefrom.

13. A lathe comprising, in combination, a pair of spaced spindles, means adapted to mount a blank between the spindles comprising a member adapted to yield when a certain pressure is obtained, and means adapted to rotate the blank on the spindles comprising devices adapted to yield to avoid disturbance of the blank laterally.

14. A lathe comprising, in combination, a pair of spaced spindles, means adapted to mount a blank between the spindles comprising a member adapted to yield when a certain pressure on the blank is obtained, and a chuck comprising a floating member having jaws adapted to engage the blank for rotation without disturbing the position of the blank between the spindles.

15. A lathe comprising, in combination, a pair of spaced centers, means adapted to position a blank between the centers, means for engaging the centers with the blank comprising a member adapted to yield when a certain pressure is obtained, means adapted to rotate the blank on the centers comprising devices adapted to yield to avoid disturbance of the blank laterally, a movable tool carriage adapted to support a tool in operative position with the blank, means having a uniform back and forth throw adapted to move the carriage, intermediate devices for varying the extent of movement of the carriage by the said devices, and a common actuating mechanism for the positioning means and for the carriage.

16. A lathe comprising spindles provided with centers, one of said spindles being rotative, means for automatically positioning a blank between said centers, and floating means operative with the rotative spindle for gripping the blank without disturbing its position of the blank on the centers.

17. A lathe comprising spindles provided with centers to receive the work therebetween, one of said spindles being rotative, a floating chuck operative with said rotating spindle, and means for automatically opening and closing the jaws of the chuck without disturbing the position of the blank on the centers.

18. A lathe comprising spindles provided with centers, one of said spindles being rotative, means for automatically moving one of the spindles toward and from the other, means for positioning a blank between the separated spindles, a floating chuck connected with the rotative spindle, and means for automatically opening and closing the jaws of said chuck to clamp the blank without disturbing its position on the centers.

19. A lathe comprising spindles provided with centers, means for positioning a blank between said centers, a rotary chuck provided with jaws for engaging and rotating the blank between said centers without disturbing the position of the blank on the centers, spring means tending constantly to close said jaws, independent means for opening the jaws, and means for inserting the blank within the opened jaws.

20. A lathe comprising spindles provided with centers, automatic means for successively positioning blanks between said centers, a blank rotating chuck comprising two elements one of which floats with respect to the other, the jaw mechanism of the chuck being carried by the floating element whereby the blanks may be gripped without disturbing their positions on the centers, and means for automatically operating the jaw mechanism to chuck and release the blanks in succession.

21. A lathe comprising spindles provided with centers, one of which is rotary and the other of which is endwise movable, automatic means for reciprocating said endwise movable spindle, a chuck operative with said rotary spindle, means for automatically positioning a blank between said centers when said endwise movable spindle is in its outer position, the inward movement of said endwise movable spindle serving to thrust the blank into said chuck, and means for automatically operating the chuck to grip the blank without disturbing its position on the centers.

22. A lathe comprising spindles provided with centers, one of said spindles being rotative and one of said spindles being endwise movable, a chuck provided with blank clamping jaws rotative with said rotative spindle, a device having a frictional connection with said endwise movable spindle, means for operating said device to reciprocate said endwise movable spindle, and clamping means for said endwise movable spindle operable by said device.

23. A lathe comprising spindles provided with centers, a blank magazine, a device for transferring a blank from the magazine to the space between said centers, means for adjusting the magazine to receive blanks of different sizes, and means operated by said magazine adjusting means for adjusting the blank-carrying portion of the transferring device to maintain said blank-carrying portion in a definite relation to said centers.

24. An automatic lathe including in combination, a pair of centers, a rotary spindle carrying one of said centers, a longitudinally movable non-rotatable spindle carrying the other center, means for automatically positioning a blank between said centers, means for automatically operating said longitudinally movable spindle to secure the blank on said centers with a limited pressure, means for automatically gripping the blank to drive it in connection with the rotary spindle without disturbing its position on the centers, a tool-carriage traveling longitudinally with respect to the axis of the centers, and mechanism for reciprocating said tool-carriage in proper timed relation to the operation of the blank positioning, securing and gripping means.

25. A lathe comprising in combination, a pair of spindles provided with centers, one of said spindles being rotative, means connected with said rotative spindle for gripping the blank without disturbing its position on the centers, a tool-carriage, means for reciprocating said tool-carriage longitudinally with respect to the axis of the blank, and automatic mechanism for operating in harmony said gripping means and said reciprocating means.

26. A lathe comprising opposed spindles provided with centers set apart to embrace between them such centers, a space adapted to receive blanks automactically fed thereto, a magazine for containing blanks, means for transferring a blank from the magazine to the space between said centers, means for engaging the centers with the blank, means for automatically securing the blank to one of said spindles, and means for simultaneously adjusting the magazine and transferring means to operate in connection with blanks of different sizes.

In testimony whereof I affix my signature in presence of two witnesses.

FRIEDERICH MÜLLER.

Witnesses:
CLIFFORD D. PERKINS,
FRANKLIN H. WOODFORD.

It is hereby certified that in Letters Patent No. 1,252,928, granted January 8, 1918, upon the application of Friederich Müller, of Hartford, Connecticut, for an improvement in "Lathes," errors appear in the printed specification requiring correction as follows: Page 7, line 13, strike out the word "initially", second occurrence; same page, line 62, strike out the words "or band"; page 10, line 76, claim 16, strike out the words "of the blank"; and that the said Letters Patent should be read with these corrections therein that the same may conform to the record of the case in the Patent Office.

Signed and sealed this 5th day of March, A. D., 1918.

[SEAL.]

R. F. WHITEHEAD,

*Acting Commissioner of Patents.*

Cl. 82—2.